(12) United States Patent
Kopra

(10) Patent No.: US 8,175,921 B1
(45) Date of Patent: May 8, 2012

(54) LOCATION AWARE PRODUCT PLACEMENT AND ADVERTISING

(75) Inventor: Toni Kopra, Espoo (FI)

(73) Assignee: Nokia Corporation, Espoo (FI)

( * ) Notice: Subject to any disclaimer, the term of this patent is extended or adjusted under 35 U.S.C. 154(b) by 2086 days.

(21) Appl. No.: 09/580,583

(22) Filed: May 30, 2000

(51) Int. Cl.
*G06Q 30/00* (2006.01)
(52) U.S. Cl. ............... 705/14.58; 705/14.57; 705/14.64
(58) Field of Classification Search ............... 705/1, 10, 705/14
See application file for complete search history.

(56) References Cited

U.S. PATENT DOCUMENTS

| | | |
|---|---|---|
| 4,825,045 A | 4/1989 | Humble |
| 4,908,761 A | 3/1990 | Tai |
| 4,910,672 A | 3/1990 | Off et al. |
| 4,996,642 A | 2/1991 | Hey |
| 5,053,957 A | 10/1991 | Suzuki |
| 5,056,019 A | 10/1991 | Schultz et al. |
| 5,173,851 A | 12/1992 | Off et al. |
| 5,201,010 A | 4/1993 | Deaton et al. |
| 5,327,508 A | 7/1994 | Deaton et al. |
| 5,353,218 A | 10/1994 | De Lapa et al. |
| 5,353,219 A | 10/1994 | Mueller et al. |
| 5,481,094 A | 1/1996 | Suda |
| 5,502,636 A | 3/1996 | Clarke |
| 5,504,675 A | 4/1996 | Cragun et al. |
| 5,539,822 A | 7/1996 | Lett |
| 5,573,244 A | 11/1996 | Mindes ............... 463/26 |
| 5,576,951 A | 11/1996 | Lockwood |
| 5,583,763 A | 12/1996 | Atcheson et al. |
| 5,592,560 A | 1/1997 | Deaton et al. |
| 5,612,868 A | 3/1997 | Off et al. |
| 5,615,342 A | 3/1997 | Johnson |
| 5,621,812 A | 4/1997 | Deaton et al. |
| 5,625,776 A | 4/1997 | Johnson |
| 5,638,457 A | 6/1997 | Deaton et al. |
| 5,649,114 A | 7/1997 | Deaton et al. |
| 5,710,887 A | 1/1998 | Chelliah et al. |
| 5,715,399 A | 2/1998 | Bezos |
| 5,717,468 A | 2/1998 | Baryla .................... 348/563 |
| 5,828,839 A | 10/1998 | Moncreiff ............ 395/200.34 |
| 5,832,457 A | 11/1998 | O'Brien et al. |
| 5,848,396 A | 12/1998 | Gerace ............................ 705/10 |
| 5,852,775 A * | 12/1998 | Hidary ...................... 455/412.1 |
| 5,870,030 A | 2/1999 | DeLuca et al. |
| 5,949,326 A | 9/1999 | Wicks et al. ............ 340/286.01 |

(Continued)

FOREIGN PATENT DOCUMENTS

EP    873772    4/1998

(Continued)

OTHER PUBLICATIONS

"WAP—The Wireless Application Protocol" by Christer Erlandson and Per Ocklind, Published by "Ericsson Review No. 4, 1998".

(Continued)

*Primary Examiner* — Yehdega Retta
(74) *Attorney, Agent, or Firm* — Ditthavong Mori & Steiner, P.C.

(57) ABSTRACT

A product placement and advertising method utilizes a video signal having a product placement with an active hypertext link and/or a linking advertisement. If the user of a mobile terminal receiving the video signal clicks on the product placement or linking advertisement, the server obtains the location of the mobile terminal and generates or selects an advertisement which is related to the location.

23 Claims, 14 Drawing Sheets

U.S. PATENT DOCUMENTS

| | | | |
|---|---|---|---|
| 6,005,603 A | 12/1999 | Flavin | 348/9 |
| 6,006,265 A * | 12/1999 | Rangan et al. | 709/226 |
| 6,009,411 A | 12/1999 | Kepecs | |
| 6,026,370 A | 2/2000 | Jermyn | |
| 6,055,513 A | 4/2000 | Katz et al. | |
| 6,055,573 A | 4/2000 | Gardenswartz et al. | |
| 6,067,524 A | 5/2000 | Byerly et al. | |
| 6,076,068 A | 6/2000 | De Lapa et al. | |
| 6,112,981 A | 9/2000 | McCall | |
| 6,123,259 A | 9/2000 | Ogasawara | |
| 6,173,316 B1 * | 1/2001 | De Boor et al. | 709/218 |
| 6,188,398 B1 * | 2/2001 | Collins-Rector et al. | 725/37 |
| 6,198,935 B1 * | 3/2001 | Saha et al. | 455/456.2 |
| 6,208,866 B1 * | 3/2001 | Rouhollahzadeh et al. | 455/456.5 |
| 6,295,455 B1 * | 9/2001 | Fischer et al. | 455/456.2 |
| 6,326,918 B1 * | 12/2001 | Stewart | 342/457 |
| 6,332,127 B1 * | 12/2001 | Bandera et al. | 705/14 |
| 6,353,298 B1 * | 3/2002 | Jeffrey | 318/293 |
| 6,353,398 B1 * | 3/2002 | Amin et al. | 340/995.12 |
| 6,357,042 B2 * | 3/2002 | Srinivasan et al. | 725/32 |
| 6,414,602 B2 * | 7/2002 | Polyakov | 340/691.6 |
| 6,430,599 B1 * | 8/2002 | Baker et al. | 709/203 |
| 6,459,906 B1 * | 10/2002 | Yang | 455/556.1 |
| 6,496,981 B1 * | 12/2002 | Wistendahl et al. | 725/112 |
| 6,522,875 B1 * | 2/2003 | Dowling et al. | 455/414.3 |
| 6,553,219 B1 * | 4/2003 | Vilander et al. | 455/411 |
| 6,711,379 B1 * | 3/2004 | Owa et al. | 455/3.01 |
| 6,725,022 B1 * | 4/2004 | Clayton et al. | 455/154.1 |
| 6,738,630 B2 * | 5/2004 | Ashmore | 455/456.3 |
| 7,194,758 B1 * | 3/2007 | Waki et al. | 725/141 |

FOREIGN PATENT DOCUMENTS

| | | |
|---|---|---|
| EP | 0873772 | 10/1998 |
| EP | 0899950 | 3/1999 |
| GB | 2330503 | 8/1998 |
| WO | 9600950 | 1/1996 |
| WO | WO 97/07467 | 2/1997 |
| WO | 9721183 | 6/1997 |
| WO | WO/97/21183 | 6/1997 |
| WO | 9723997 | 7/1997 |
| WO | WO 97/23997 | 7/1997 |
| WO | 9831149 | 4/1998 |
| WO | 9909744 | 8/1998 |
| WO | WO 98/59506 | 12/1998 |
| WO | WO 99/04582 | 1/1999 |
| WO | 0022860 | 4/2000 |
| WO | 0029979 | 5/2000 |
| WO | WO 00/29979 | 5/2000 |
| WO | 0115450 | 3/2001 |
| WO | WO 01/43361 | 6/2001 |

OTHER PUBLICATIONS

Couderc, et al., "Improving Level of Service for Mobile Users Using Context-Awareness", Reliable Distributed Systems, 1999, pp. 24-33.

Couderc P. et al., "Improving level of service for mobile users using context-awareness" Reliable Distributed Systems, 1999. Proceedings of the 18th IEEE Symposium on Lausanne, Switzerland, Oct. 19-22, 1999, Los Alamitos, CA, USA, IEEE Comput. Soc., U.S. Oct. 19, 1999, pp. 24-33, XP010357024 ISBN: 0-7695-0290-3.

"Statement in Accordance with the Notice from the European Patent Office dated Oct. 1, 2007 concerning business methods," Nov. 1, 2007, pp. 1-2.

European Office Action for corresponding EP Application No. 01 934 225.2-1238, Aug. 9, 2011, pp. 1-5.

European Search Report for corresponding EP Application No. 10184441.3-1238/2287798, Aug. 10, 2011, pp. 1-5.

* cited by examiner

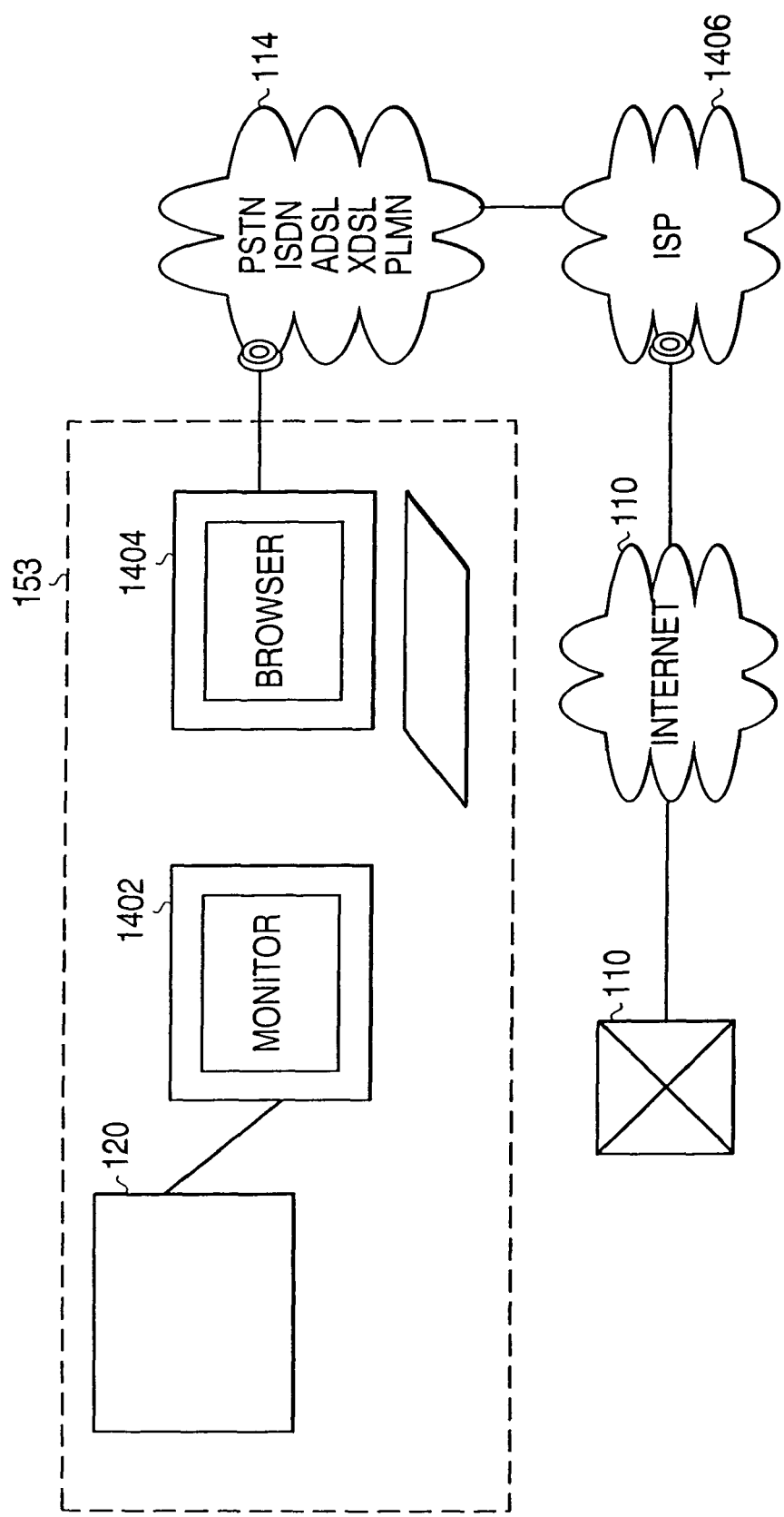

LOCATION AWARE PRODUCT PLACEMENT AND ADVERTISING

CROSS-REFERENCE TO RELATED APPLICATIONS

This application is related to my U.S. patent application entitled "Chat System for a Specific Location" (U.S. patent application Ser. No. 09/580,442); my U.S. patent application entitled "Video Message Sending" (U.S. patent application Ser. No. 09/580,443); and my U.S. patent application entitled "Navigation Aware News Service" (U.S. patent application Ser. No. 09/580,582), all of which are being filed on even date herewith and all of which are hereby incorporated by reference.

BACKGROUND OF THE INVENTION

1. Field of the Invention

The present invention relates to the field of telecommunications. In particular, the present invention relates to a technique for selectively providing product placement and advertising to mobile terminals based on the location of the mobile terminals.

2. Description of the Related Art

In product placements, a particular product is intentionally included in a movie or television program. In conventional advertising, an advertisement is widely distributed in order to be seen or heard by the general public. Such techniques are only modestly effective in building general brand awareness. It is more desirable to target advertisements to customers who are known to have the inclination or potential to immediately purchase or make further inquiry about the product.

With the widespread use of the Internet, banner ads have generally come into use on websites, but they are inefficient and not particularly cost effective. Consequently, advertisers have begun to utilize the Internet for targeted advertising products and services.

U.S. Pat. No. 5,937,392 to Alberts, entitled "Banner Advertising Display System and Method With Frequency of Advertisement Control," has attempted to alleviate the untargeted advertising problem by specifically targeting advertisements to users from a particular geographic location, etc.

U.S. Pat. No. 5,948,061, to Merriman et al, entitled "Method of Delivery, Targeting, and Measuring Advertising Over Networks," discloses an arrangement for the targeting of the delivery of advertisements over the Internet based on the tracking of data with regard to individual users.

U.S. Pat. No. 5,974,451, to Simmons, entitled "System and Method for Distributing Bulletins to External Computers Accessing Wide Area Computer Networks," targets advertising on the Internet based on a specific request for information from a user.

U.S. Pat. No. 5,933,811, to Angles et al, entitled "System and Method for Delivering Customized Advertisements Within Interactive Communication Systems," delivers customized advertisements to users on the Internet based on consumer profiles of the users.

Lastly, U.S. Pat. No. 5,999,912, to Wodarz et al., discloses a dynamic advertising scheduling, display and tracking arrangement for the Internet. In the disclosed arrangement, advertisements are added to a requested web page in accordance with advertisement tag characteristics which include user based characteristics such as age, gender, language, etc., advertisement tag selection based on the time of day or number of times that the advertisement has been selected during a specific time period, etc.

SUMMARY OF THE INVENTION

Recent improvements in technology have allowed the widespread proliferation of higher speed Internet access, such as 56K modems, Digital Subscriber Line (DSL) and cable TV Internet connections, etc. These high speed Internet connections can support video streaming—the transmission of compressed video signals over the Internet so as to produce picture and sound comparable to that of a standard television receiver. Furthermore, high speed data services to mobile terminals are supported by advanced Third Generation (3G) Universal Mobile Telecommunications System (UMTS) or Global System for Mobile Communication/General Packet Radio Service (GSM/GPRS) mobile networks.

One aspect of the present invention takes advantage of these advancements by placing products as active hypertext links in images and streaming Internet video so that the viewer can click on the position of the product in the image or video to link to information about the product.

Another aspect of the present invention is that, when the user clicks on such a product placement in video (or other Internet advertisement with a active hypertext link), he is directed to a site where the product is represented and local resellers are listed for immediate purchase of the product. The hypertext link and site are instantly personalized according to the geographical location of the mobile terminal so that the user gets the representation of the product and information of the nearest reseller of the product. They also can be continuously updated as the location of the mobile terminal changes.

BRIEF DESCRIPTION OF THE DRAWINGS

The foregoing and a better understanding of the present invention will become more apparent from the following detailed description of example embodiments in the claims when read in connection with the accompanying drawings, all being part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

FIG. 14 depicts a block diagram of a direct reception scenario.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The presently preferred embodiment of the disclosed innovations is the simultaneous reception and display of a DVB-T signal and display of dynamic or static content on a television. The static content is like that of a wireless terminal, e.g., a mobile phone, a media phone, or an electronic book.

Various embodiments of the disclosed method and system will be described using interactive betting as an example of interactive content supplied to an end viewer. However, it should be noted that interactive betting is just one of many services that can be provided with the disclosed embodiments.

Figure 1:
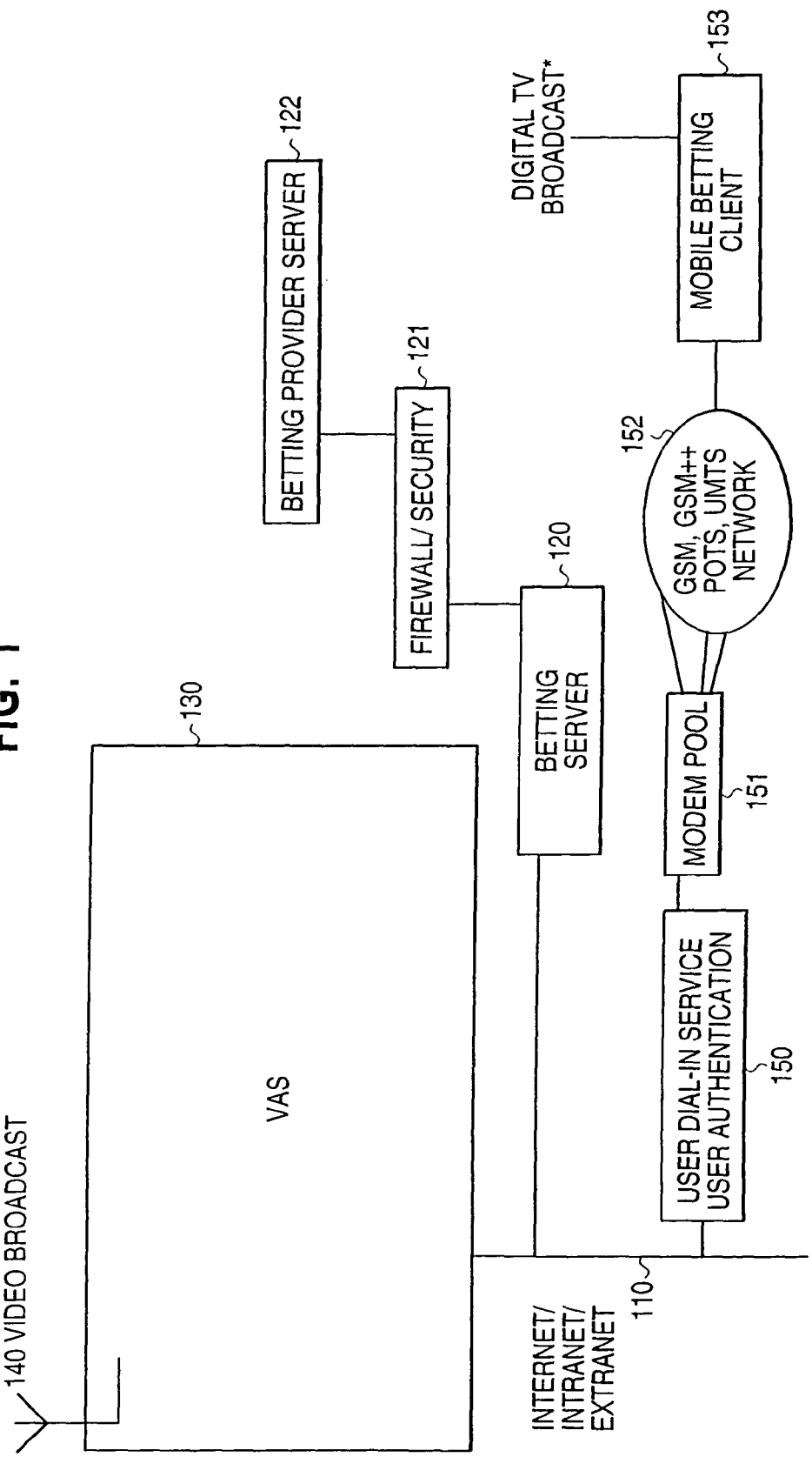
FIG. 1 illustrates an example of the architecture of an Internet system in which an embodiment of the present invention can be practiced.

FIG. 1 illustrates an example of the architecture of an Internet system in which an embodiment of the present invention can be practiced.

A video signal received by TV signal receiver 140 is inputted into application server 130. As will be discussed in detail below, the application server 130 adds product placement and/or advertising to the video signal prior to forwarding it to the mobile terminals of a plurality of users 153 via Internet 110. Although only the Internet is shown in FIG. 1, it is understood that a wireless communication network is present which provides communication services to the mobile terminals 153, including Internet access. Other service nodes like interactive provider server or betting provider server 120 can be connected to application server 130.

In the various disclosed embodiments, an interactive application, betting, for example, is facilitated. FIG. 1 depicts a block diagram of the creation, reception, and response to interactive services in the presently preferred embodiment. A television signal 140 is received, compressed, and converted for streaming onto the Internet 110. Betting information is also created and streamed onto the Internet 110. A mobile betting client 153 can display the television program 120 and the betting information simultaneously and a viewer can interactively select betting via the mobile betting client 153. Finally, the mobile betting client 153 transmits information to the host facility 122 by connecting to a network 110 linked with the host facility 122, for example, the Internet.

Alternatively, a host facility 122 can integrate data to be supplied to the viewer into the vertical blanking intervals of the television signal 140 and broadcast (or stream) the integrated signal. A mobile betting client 153 receives the broadcast integrated signal and separates the integrated signal into a television signal and the supplied dynamic or static data.

Digital broadcast technology allows for services that can present many-to-one, many-to-many, and one-to-one communication. DVB has defined delivery media for satellite services (DVB-S, direct-to-home viewing, cable (DVB-C) run in several countries, and terrestrial, or "over the air", (DVB-T) planned for 17 countries. Use of return channels enables digital receivers to provide a variety of services including Internet, television, and web content. Processing of the digital signal can be accomplished on a desktop or laptop computer.

Figure 2:
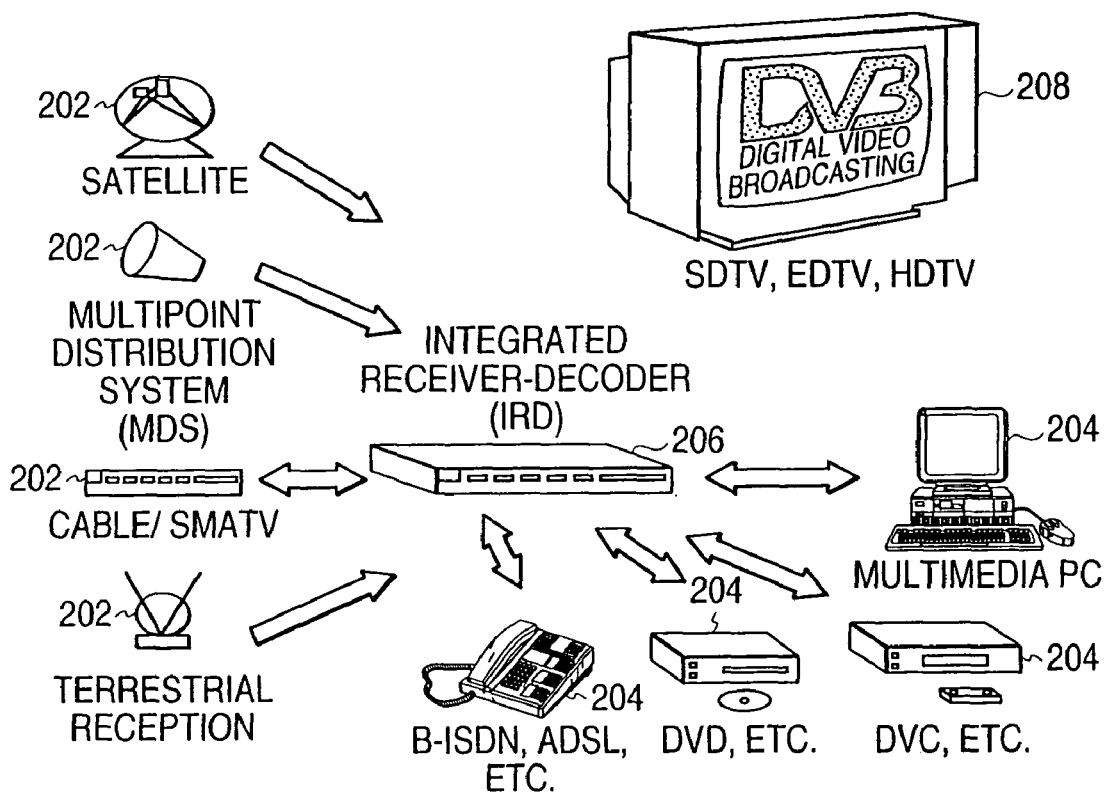
FIG. 2 depicts a block diagram of digital services being delivered to a viewer.

FIG. 2 depicts a block diagram of digital services being delivered to a viewer. The interfaces for the media can include, for example, GSM, GSM+, UMTS, ISDN, PSTN, ATM, and others 202. The protocol and interface enable a cluster of interconnected devices in the home, each receiving and processing digital broadcast services 204. A set top box (STB) or integrated receiver-decoder (IRD), such as the D-Box™ manufactured by Nokia, Inc., 206 integrates the services for viewing on a television 208.

The television receiver that incorporates the invention should include a plug-in PIP module. Most receivers that incorporate PIP and other features also include a microprocessor control which, via a suitable control bus, periodically interrogates certain functional blocks and modules in the television receiver chassis to determine whether they are present and, if so, to control their operation. In the case of a PIP module, polling by the microprocessor indicates whether the module is present in the receiver. If it is, the microprocessor arranges to switch the composite video signals (from the tuner and external sources) through the PIP processor and then to the main video processor of the television receiver, in preference to the normal composite video produced. Thus, the video processor of the television receiver has its inputs supplied from either the main chassis in the event there is no PIP module or from the PIP processing module.

A viewer watches a mobile betting client 153, for example, a digital television, which is able to act as an Internet browser. Commercial applications such as Inet solution enable television/browser functionality. A dial-up connection or other communications device, such as a LAN connection, can provide Internet connectivity. Along with web browsing functions, the mobile betting client is equipped with streaming video and audio reception and display and secure connection capabilities.

Figure 3:
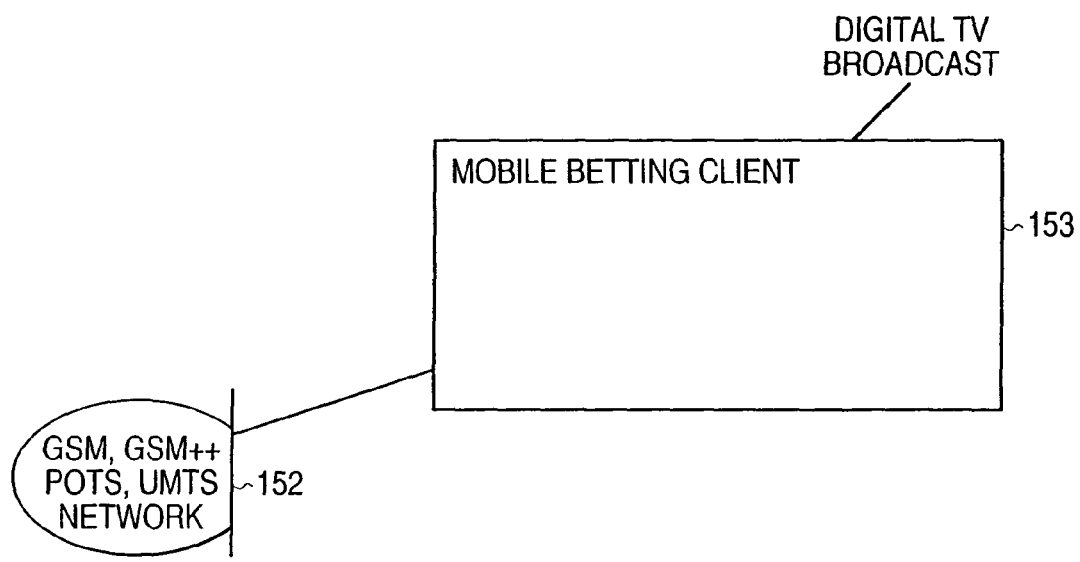
FIG. 3 depicts a block diagram of the viewer's connectivity and interaction with the provided interactive services.

FIG. 3 depicts a block diagram of the connectivity of the viewer and interaction with the provided interactive services. In the presently preferred embodiment, the mobile betting client 153 receives an integrated digital broadcast signal (DVB-T). Reception of the signal can be accomplished through various means. In the presently preferred embodiment, the mobile betting client receives the signal over a GSM, GSM++, POTS, UMTS, or other type of connection 152. The mobile connection 152 is itself connected to a network such as an extranet, intranet, or the Internet 110. Mobile connection to the network 116 may take place in a conventional manner over a modem pool 151 with user dial-in and authentication services 150.

Figure 4:
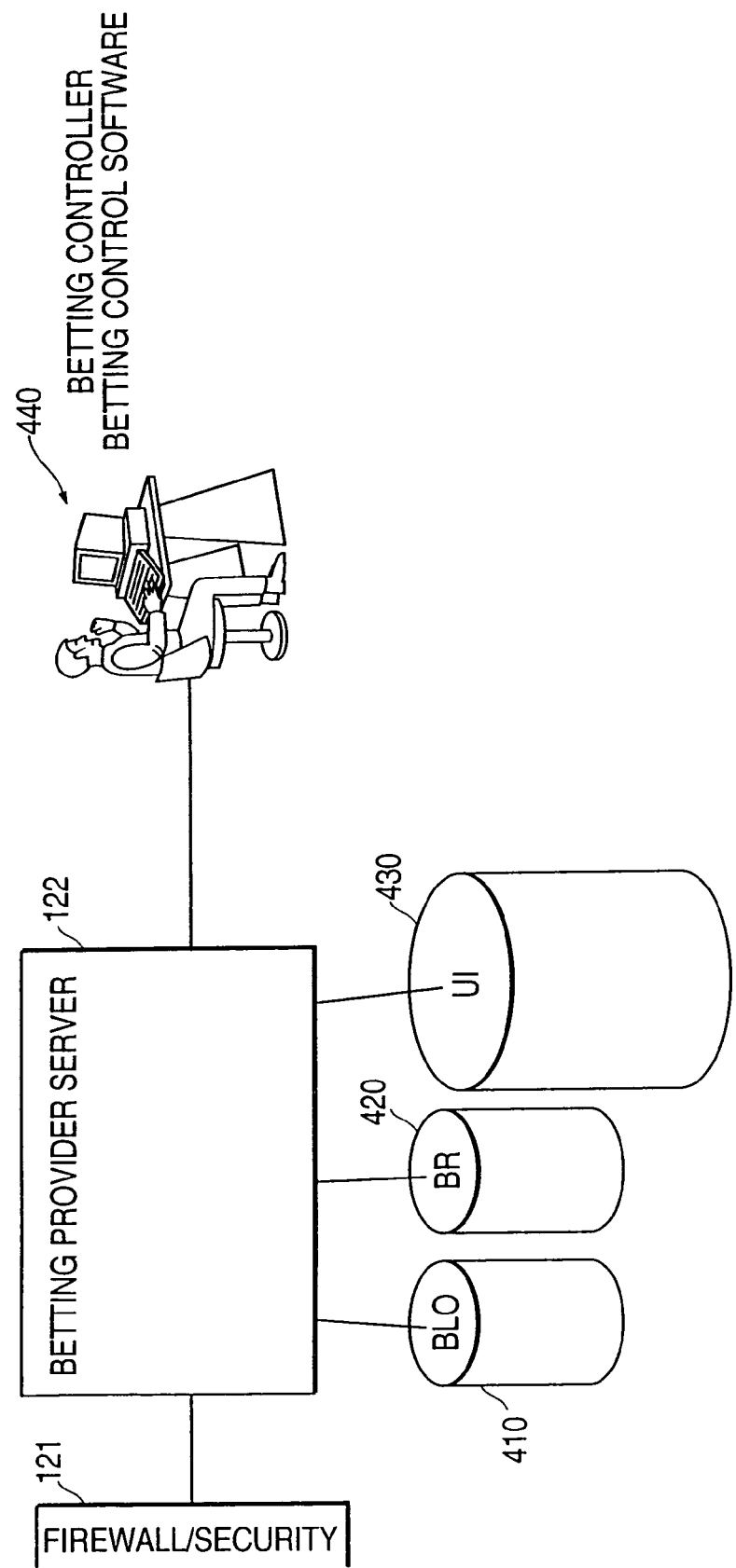
FIG. 4 depicts a block diagram of the betting provider architecture.

FIG. 4 depicts a block diagram of the betting provider architecture. In the presently preferred embodiment, the betting provider information is protected from network snooping by a security device such as a firewall 121. At least one betting provider server 122 resides behind the firewall. Software running on the server tracks viewers (bettors) in various competitions.

One task of the server 122 is to authenticate viewers. In the presently preferred embodiment, a user information (UI) database 430 is maintained. The UI database 430 stores usernames and associated passwords, user account information, user preferences, and other user specific information. In addition to tracking viewers, the server 122 receives and accepts bets that have been requested by the viewer to a betting server 120 running on the network side of the firewall 121 and connected to a network such as an extranet, intranet, or the Internet 110. This betting server 120 acts as an interface between interactive services viewers on the network and the actual betting provider.

The betting provider server 122 receives betting content (questions to the user) and the odds of the particular bets from a betting controller 440. The betting controller 440 is responsible for creating betting content, controlling the betting event, i.e., opening and closing of betting, etc. Betting control software is used to enter and calculate betting content and odds and send them to the betting provider server 122. In the presently preferred embodiment, the betting provider server 122 stores the betting content and odds in a database (BCO) 410. The betting controller 440, via betting control software tracks, the results of the betting question and reports the results to the betting provider server 122.

The results of the bets are stored in a database (BR) 420. Once the results of a particular question are known and stored by the betting provider server 122, software on the server calculates payments to the bettors on the particular question. In the presently preferred embodiment, electronic accounts stored in the UI database 430 are used for tracking betting wins and losses. The results of the event and sub-events (betting questions) are reported to the betting server 120. The mobile betting client 153 can then receive the results from the betting server 120.

Video and audio streaming of an on-going competition on which viewers may bet is accomplished, in the presently preferred embodiment, through use of a live video/audio streaming server (VAS) 130. The VAS is connected to a network such as an extranet, intranet, or the Internet 110. A live broadcast 140 of a competition is received through an RF receiver at the server. The audio and video components of the signal are separated and digitized. The digitized audio is then compressed using one of several digital compression schemes, for example, H.728, H.729, or GSM. Likewise the digitized video is compressed using a scheme such as MPEG, MVC, H.261, etc. The digitally compressed audio and video are packaged for network transfer e.g., TCP/IP, UDP. The packets are then broadcast to the network 110 controlled by a streaming/multicasting controller.

The mobile betting client 153 has PIP functionality. This functionality allows the viewer to simultaneously view two audio/video broadcasts in the display of the mobile betting client. The two broadcasts can be, for example, the live-feed of a competition in one picture and interactive betting possibilities in another.

Figure 5:
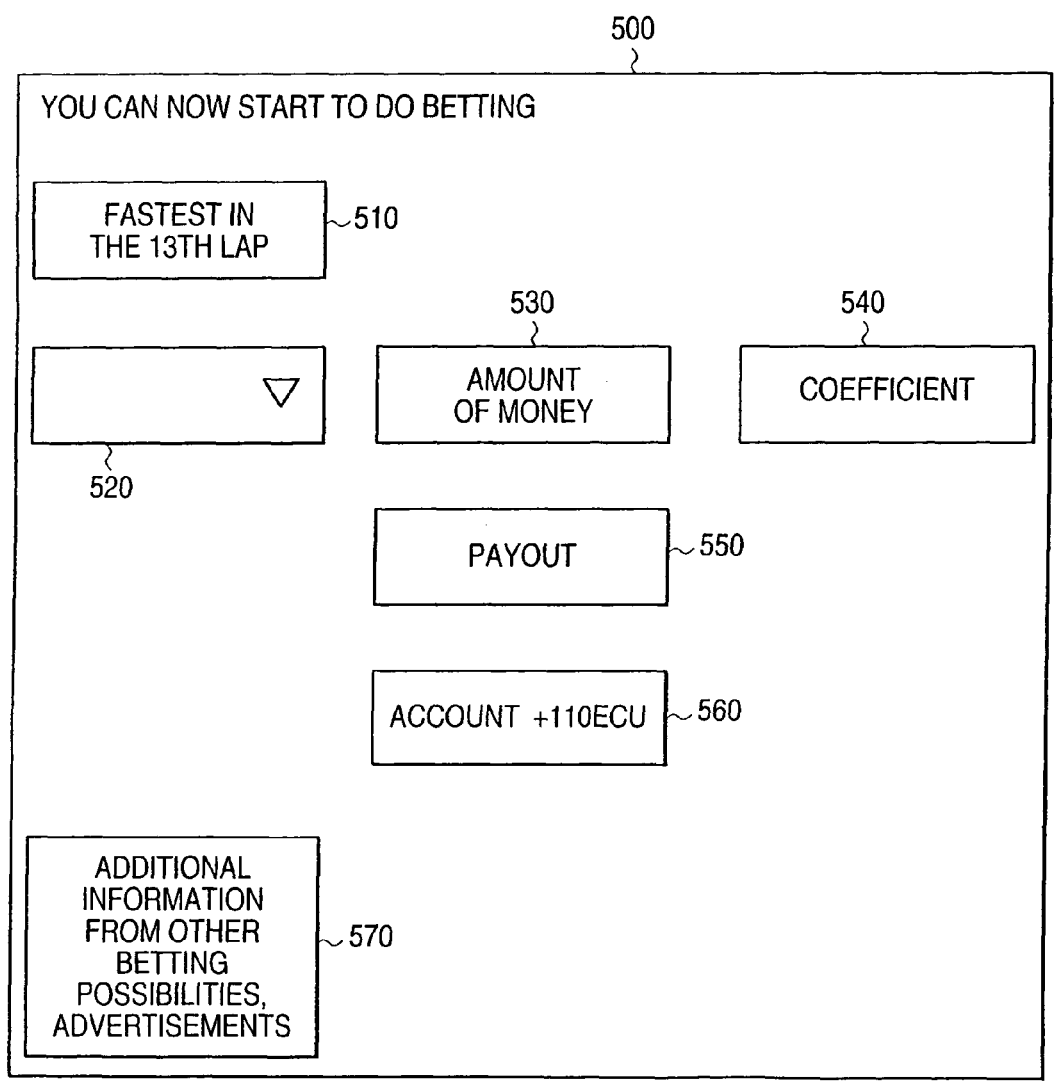
FIG. 5 is a diagram depicting a possible interactive display.
Figure 6:
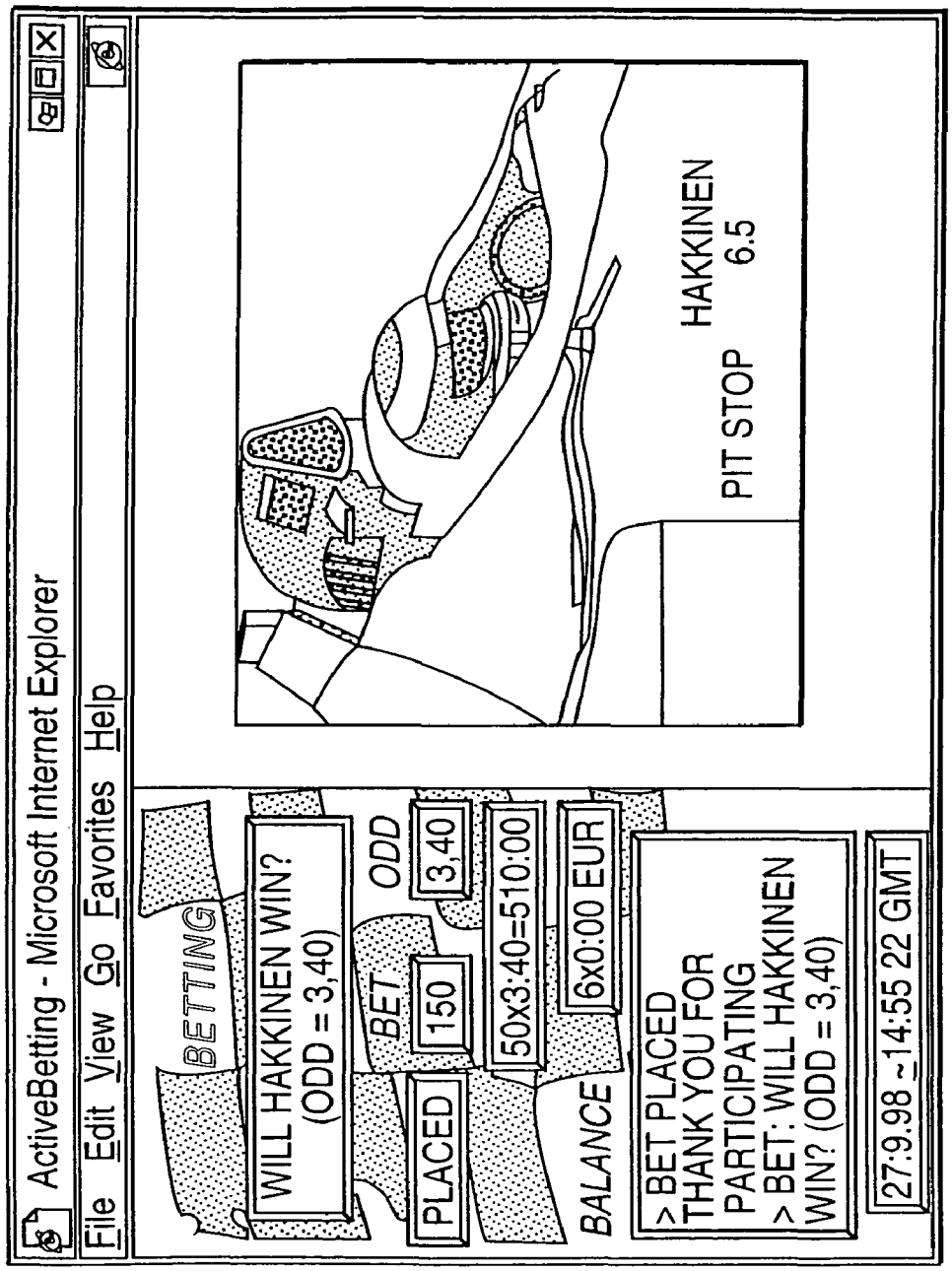
FIG. 6 depicts an integrated display with a live video feed and interactive content.

FIG. 5 is a diagram depicting a possible interactive display. Directions at the top of the display 500 inform the viewer of the status or title of the interactive activity, in this case, betting. For an application such as betting, a dialog-type box 510 is used to inform the viewer of the current question on which bets can be placed. In the context of an auto race, a question such as "Who will turn the fastest 13th lap" may be presented. A pull-down menu or radio button dialog box 520 may be presented depending on the type of question. In the above example, all of the drivers remaining in the race may be presented in a pull-down menu. Dialog boxes specific to wagering: stakes 530; odds 540; and payout 550, may also be presented. A statement of account 560 with a betting services provider may also be presented. The account is dynamic throughout the competition, registering winnings and debits as each occurs. A response dialog 570 informing the user of bets being received and the current allowable wagers may also be provided. Such a response window is also dynamically updated as available bets are made or changed. In addition to the displays listed above, dialog boxes presenting last minute betting advice or information can also be displayed. Such advice can include, for example, up to the minute status of race participants not currently being shown on the broadcast or the injury status of key players at an event. FIG. 6 depicts an integrated display with a live video feed and interactive content.

Figure 13:
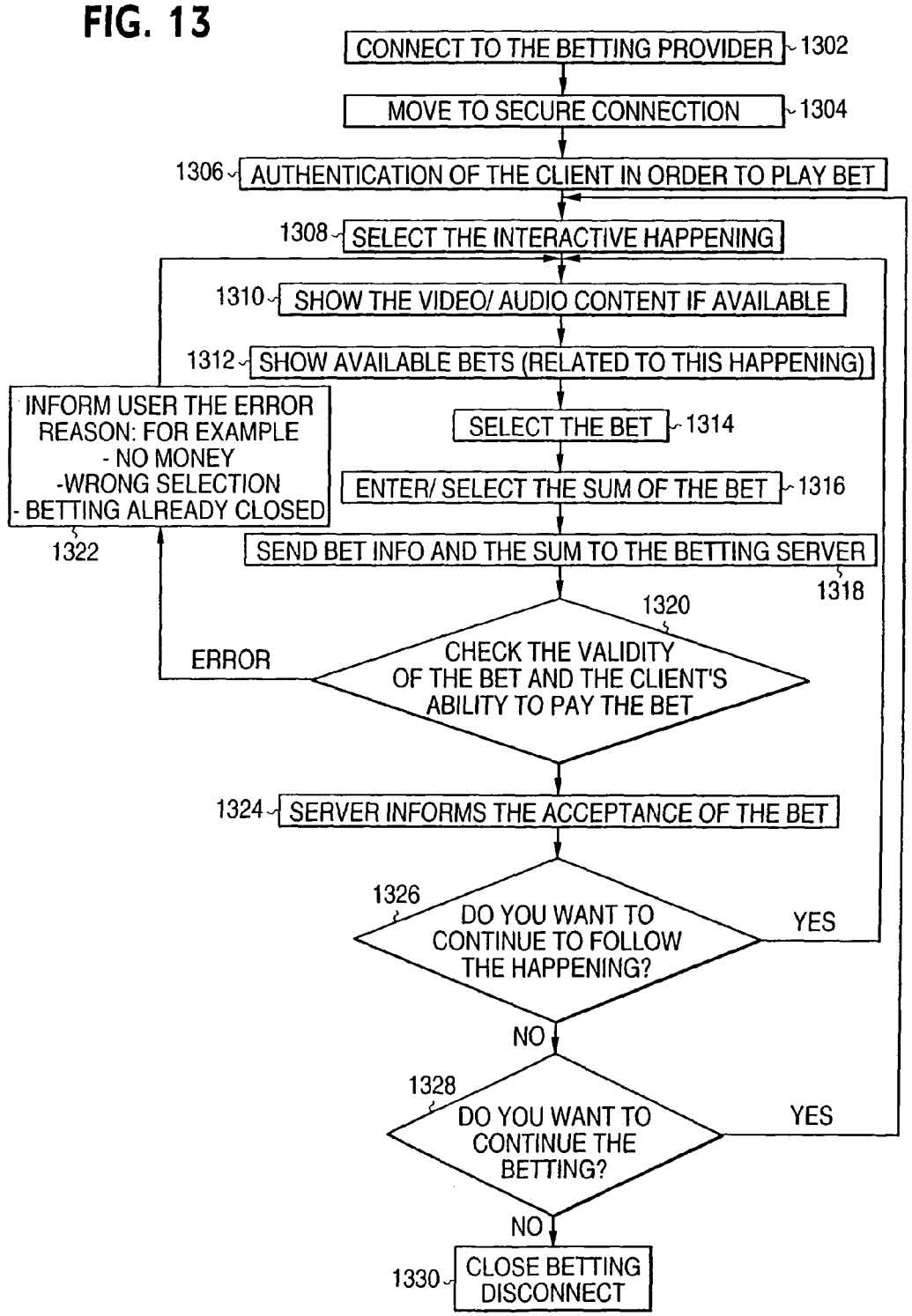
FIG. 13 depicts a flowchart of the interactive betting process.

FIG. 13 depicts a flowchart of the interactive betting process. First, a mobile betting client wishing to interactively bet connects to the betting provider (Step 1302). Once connected, a secure network connection, using, for example, encryption or secure sockets, is established (Step 1304). Once a secure connection is established, an authentication process occurs, comparing user name and password entered by the client to entries in a database of user information (Step 1306). Once authenticated, the client can select the type of competition to bet on, for example, auto racing, hockey, or football. (Step 1308). If live video and audio is available, the competition is displayed (Step 1310). The interactive betting opportunities currently available for the chosen competition are then displayed to the client (Step 1312). The betting opportunities are dynamic and will be continuously updated. The client informs the betting provider of its desire to bet (Step 1314) and the stakes Step 1316). The stakes can be variable amounts or limited to selections presented in a choice menu. The betting selection and the stakes are sent to the betting provider across the secure connection (Step 1318). The betting provider verifies the entries made by the client (Step 1320). Further checks, including client payment history and credit reports can be included in this verification step (Step 1320). If any of the entries is invalid, a valid entry is requested (Step 1322). Entries can be invalid for several reasons, for example, incorrect selection, closing of the requested betting selection prior to the bet being received, or the client's inability to cover the stakes.

If the entries are valid, the betting provider informs the client of that the particular wager has been accepted (Step 1324). Different bets open and close during the course of the competition. Once the bet has been made and accepted, the client may continue to view the competition, personally monitoring the outcome of its wager and making other bets on the same competition (Step 132). The client may also choose a different competition to view and possibly bet on (Step 1328). If the client does not wish to view or bet on any other competitions, the connection between the client and the betting provider is closed (Step 1330).

At some point after the close of a particular wager, the participants are informed of the result and appropriate adjustments to betting accounts are made. If the client is still connected to the betting provider when the results are known, the client can be informed of the results. Otherwise, the client can be informed of the status of any outstanding wagers the next time a connection to the betting provider is established.

In an alternative embodiment, a live broadcast 140 of a competition can be received directly by the mobile betting client 153. FIG. 14 depicts a block diagram of a direct reception scenario. The mobile betting client 153 can, of course, be at the viewer's home or at another viewing location. The broadcast 140 is displayed in a monitor 1402. Additionally, an Internet browser can be connected to the monitor 1402 or, alternatively, to a separate display 804 in order to interface with the betting server 120 through a switching network 114 and an Internet service provider (ISP) 1406. The PIP property of the monitor can be used if the browser and the broadcast 140 are shown in the same monitor.

In another alternative embodiment, a DVB signal with the live broadcast 140 and betting information from the betting server 120 can be integrated into a digital broadcast.

Figure 7:
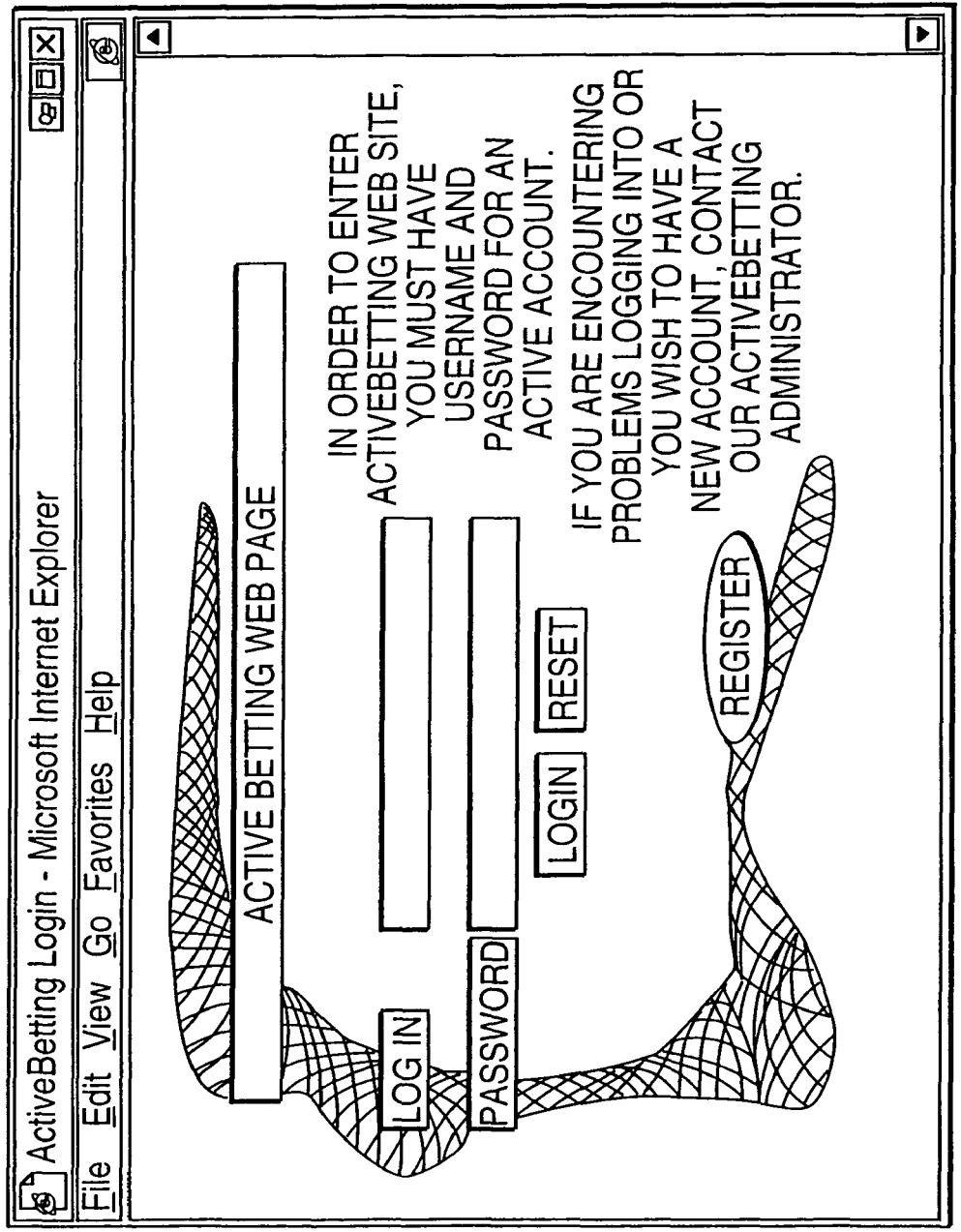
FIG. 7 depicts a betting login page which includes Login and Password fields for logging on to the interactive service.

FIG. 7 depicts a betting login page which includes Login and Password fields for logging on to the interactive service. The connection can be established over the Internet using a Virtual Private Network (VPN) tunnel and Secure Sockets Layer (SSL) connection. Once a secure connection is established, an authentication process occurs in which the users enters his user name and password in separate fields. If the incorrect user name and password are entered, the login screen is again displayed. No assumption is made that the mobile betting client has a keyboard or a mouse. However, the user can edit text with a delete key and navigate with arrow keys or other cursor control in both the horizontal and vertical planes. In order to participate in the service, the user will need to register with the betting provider server 122. New users will need to register. Registration information includes information about the device the user is connecting with, the bandwidth of the connection, and the style sheet (or skin) the user prefers. New user generally are kept from participating in the service until an active betting supervisor or administrator enables the user logon.

Figure 8:
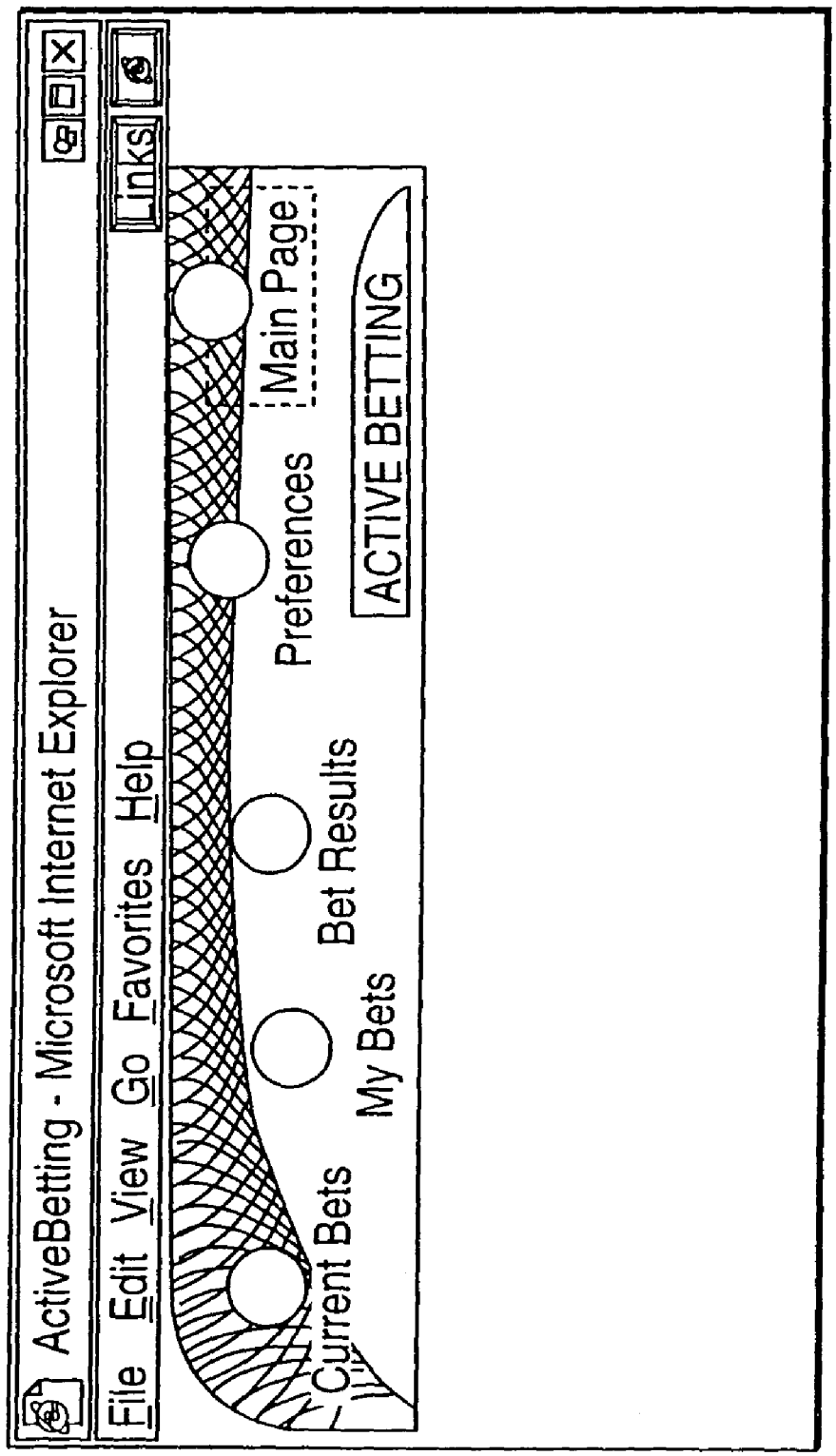
FIG. 8 depicts a main betting page supplied by the betting server 120 to the user at logon.

Logging on allows users of the service to make bets and watch both live and on-demand streaming broadcasts. FIG. 8 depicts a main betting page supplied by the betting server 120 to the user at logon. Information such as the current time, last use, and account balance information is displayed. Information such as the number of other users currently participating can also be displayed. Users can navigate from the main betting page to other pages by navigating with the arrow or cursor control keys.

After the log-in process, the only chance to navigate is downward to reach "lower" folderleaves. Thereafter, the user can navigate up or down in the levels to choose the service. In a preferred embodiment of the invention, there are four main services which can be on different pages or vertically positioned in the display screen. The main page is for betting actions and watching video transmissions. There may also be a news service providing various short messages concerning the games. A settings page allows a user to change their personal settings.

Figure 9:
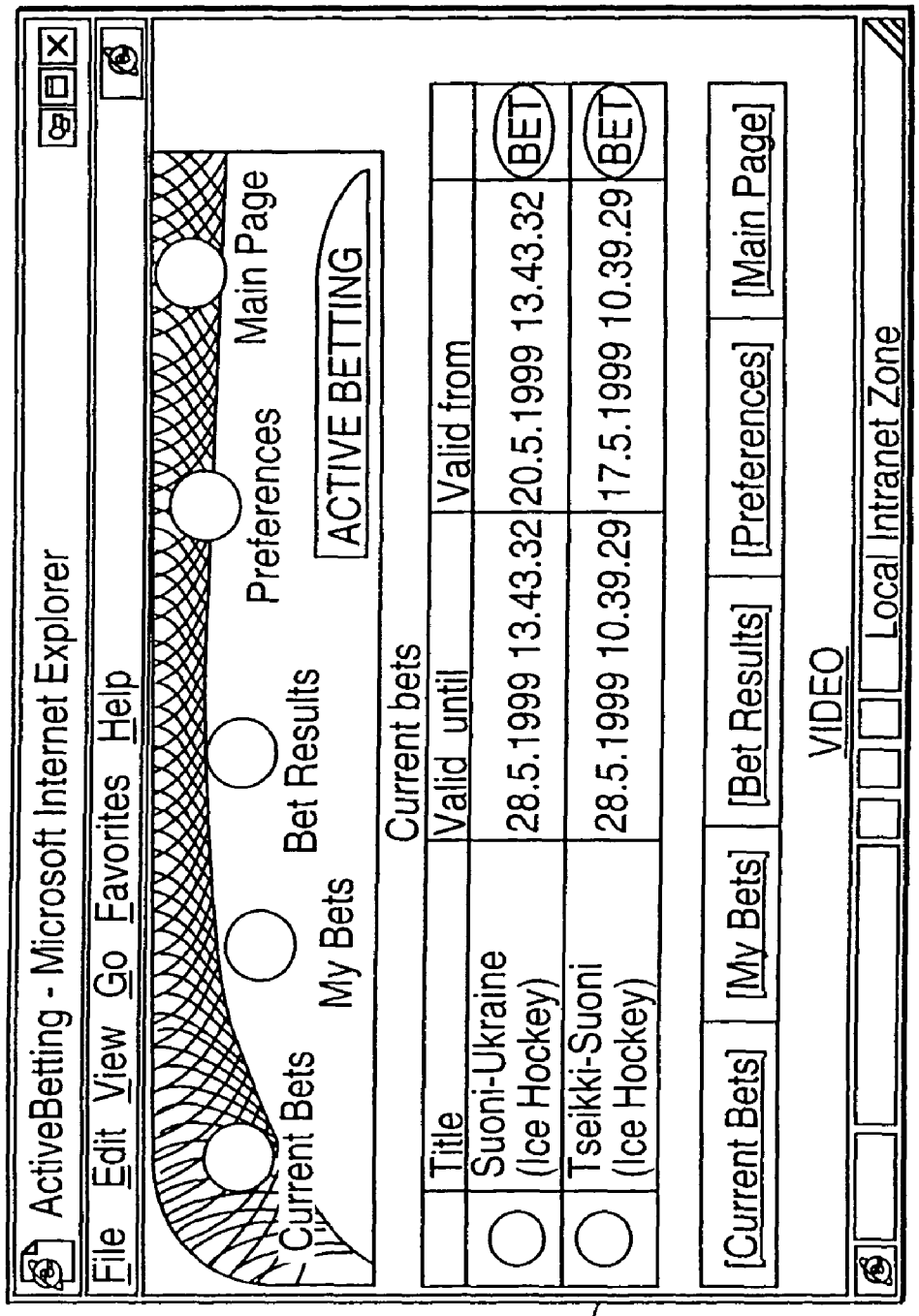
FIG. 9 depicts a page showing the status of currently available betting opportunities.

FIG. 9 depicts a page showing the status of currently available betting opportunities. The betting window, that is the times during which placed bets will be valid is also displayed. The page functionality is shown as visual or graphical illustrations. The page can contain and present betting information in many different forms, for example, warning lights. The page depicted in FIG. 9 has blinking lights in the form of traffic lights 900. The traffic lights are designed to provide advanced notification to the user of situations in the betting window. For example, one situation would be the amount of time left in the betting window. For another example, a change in the betting information which could affect the choice of bets placed. In the presently preferred embodiment, the traffic lights use color to indicate the importance or immediacy of particular information: e.g., red, orange and green.

Figure 10:
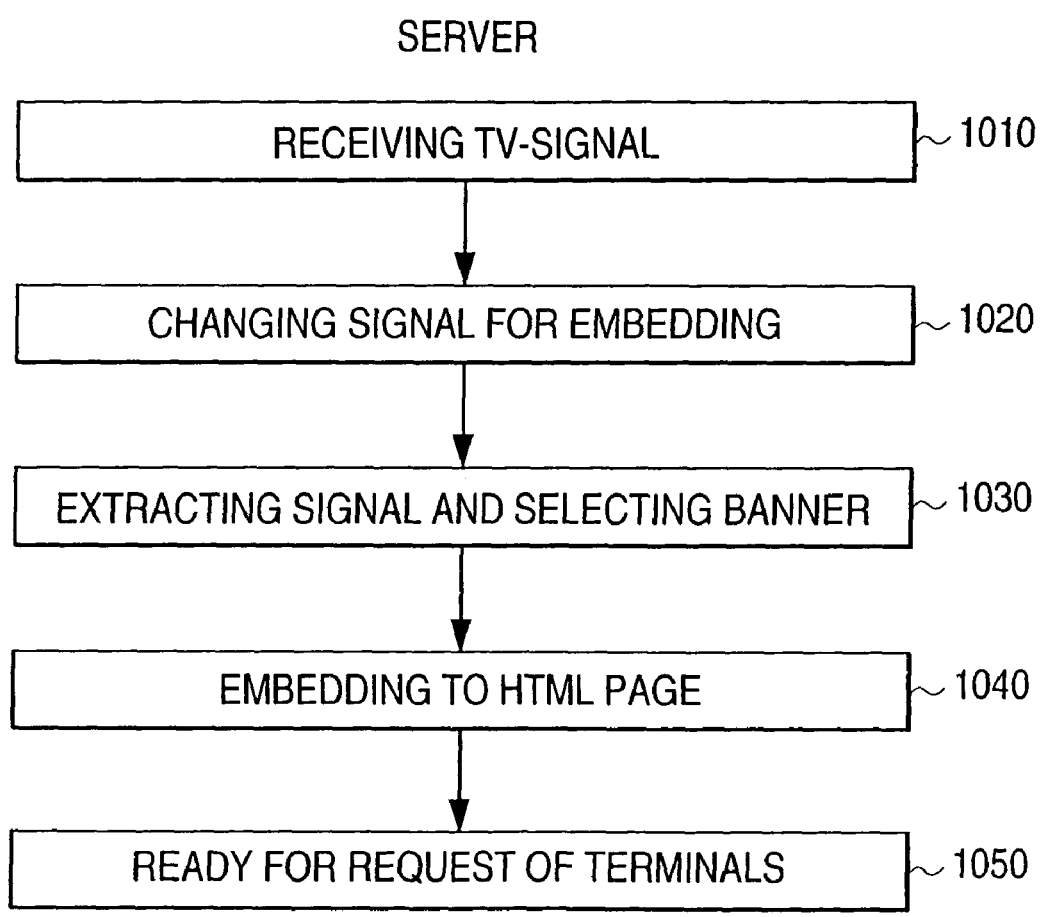
FIG. 10 is an example of a method of operation of a server placing products in Internet video and/or selecting advertisements in accordance with the present invention.

FIG. 10 illustrates an example of the operation of the application server 130 in an embodiment of the present invention.

After the video signal is received in Step 1010, the application server 130 changes the video signal for embedding (Step 1020). If the video signal is in analog form, the application server 130 needs a tuner and other circuitry to change the video signal into a preferred digital format. Application server 130 edits the video signal to embed product placements in active hypertext links and/or advertisements, such as banner ads, to the mobile terminals 153 via Internet 110 (Step 1030). (It should be understood that while this example embodiment refers to a video signal, application server 130 can also provide a web site with static or animated images having product placements in active hypertext links and/or advertisements, such as banner ads.)

The video signal may be edited with the aid of a contents scanner and/or video analysis engines for recognizing specific video images and/or may use other data recognition techniques, if available. The actual choice of the configuration of the contents scanner and/or video analysis engines would of course depend upon the content and format of the video signal. In view of the fact that video signal scanners and analysis engines are commercially available products (for example, the products of Excalibur Technologies, Mediasite and Virage), a detailed description of the configuration thereof has been omitted for the sake of brevity. The video signal output by application server 130 is thus tagged or marked with a markup language, such as hypertext markup language (HTML), or contains some other meta data to reveal the product placement and content link of the video signal.

In addition to or alternatively to the product placement in the video signal, a banner ad can be generated based on the location data corresponding to the user's mobile terminal. A banner ad generator (not shown) in application server 130 receives the location signal derived for a mobile terminal 153 in a manner such as that described below and generates localized banner ads in real-time for that location from an information database. For example, it can maintain a list of auto dealerships and their respective locations, and then provide a banner ad for the closest dealerships.

Alternatively, the banner ad generator may include a list of banner ads stored therein along with a corresponding list of locations related to each banner ad so that it need not actually generate the banner ads. Instead, it provides the banner ads or information already stored therein. The appropriate banner ad is queried from a database and retrieved from a file system. Instead of using a single database, application server 130 can use XML (extensible markup language) and XSL (extensible style language), for example, which each separate content and layout from each other.

For example, if the user of a mobile terminal in Arlington, Va. clicks on a banner ad for a particular automobile model or clicks on an active hypertext link associated with such an automobile in a streaming video signal, the banner ad generator selects the banner ad from among the list of banners that is associated with Alexandria, Va. A banner ad can be added to the streaming video signal or the streaming video signal can be stopped in order to view an advertisement.

Another example is, if F1 driver Mika Häkkinen is shown in the display driving with his car advertising West the user can select that ad and get information about West. Also the betting service can utilize this system. To the user the F1 car is shown which you have bet. Then the client sees the advertisement of the car he has bet. Therefore the betting can be done in a more personalized way of service. The application server selects the video it will send based on the bets of different cars/drivers.

The web server receives an automatically generated HTML (hyper text markup language) file from the banner ad generator (which may be implemented with Java Serviettes or ASP (active server page) or other service side technology in which the customized banner ad has been embedded (Step

1040). The customized banner ad is thus ready to be sent over Hypertext Transfer Protocol (HTTP) upon request from any one of mobile terminals 153 (Step 1050). Alternatively, some type of push technology, e.g., RMI (java remote method invocation), receiver applet, live connection and java script, can be used so that the client gets the right banner ad immediately after the location information of the mobile terminal is received.

Figure 11:
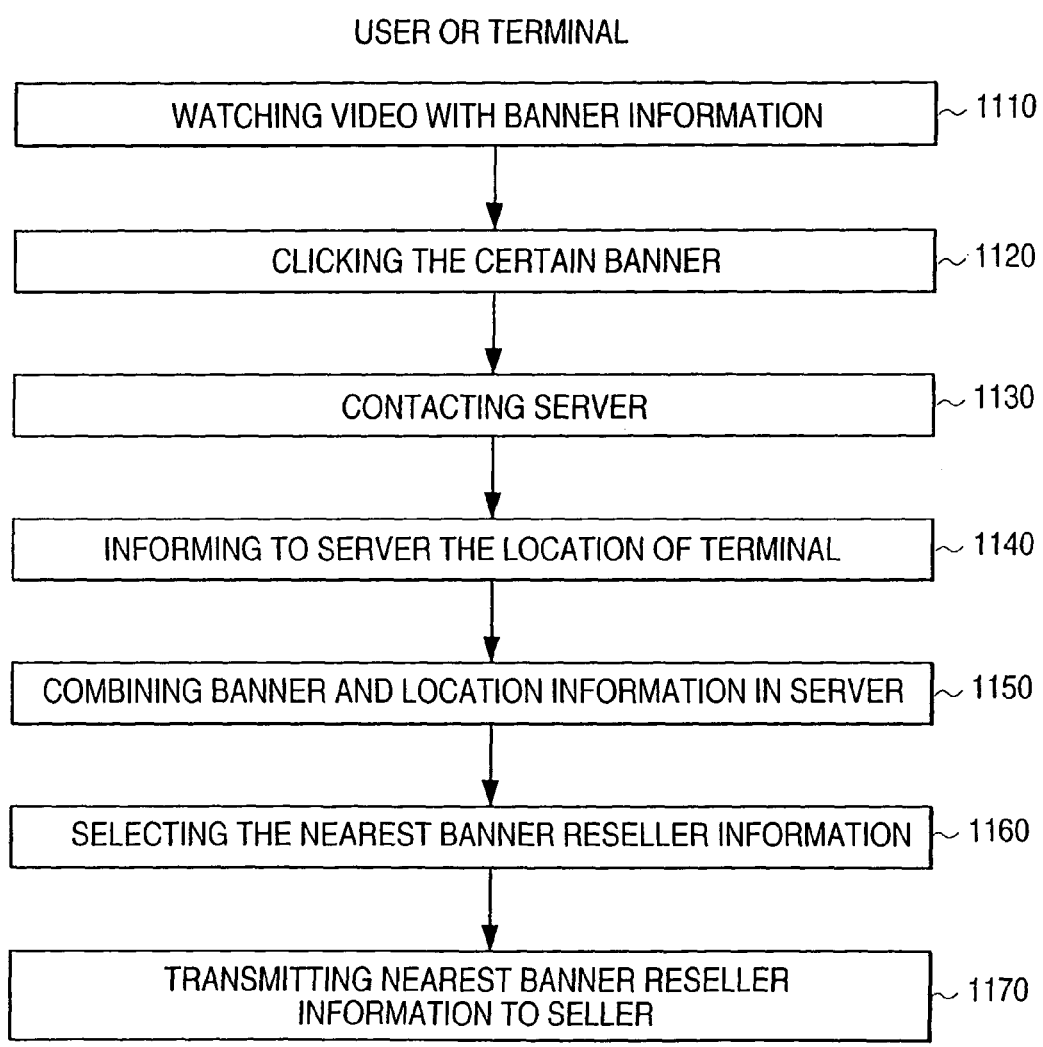
FIG. 11 illustrates an example of a method of providing the user of a mobile terminal with location aware product placement and advertising.

FIG. 11 illustrates a method of providing the user of a mobile terminal with location aware product placement and advertising as experienced from the mobile terminal. The method starts with the user viewing the mobile terminal having a video (or other image or animation) including a product placement with an active hypertext link, either with or without a banner ad (Step 1110).

In Step 1120, the user clicks on the product placement or on a banner ad that has been tagged, e.g., with a markup language or some other meta data.

Once that happens, the mobile terminal (or another element in the mobile communications network in which the mobile terminal is located) is put into contact with application server 130 (Step 1130). The mobile terminal (or other locationing element in the mobile communications network) provides location information informing the server of the location of the mobile terminal (Step 1140).

In step 1150, the banner and location information are combined in application server 130 to determine a match. That is, is there a suitable banner ad to be embedded in an html page to provide location sensitive information to mobile terminal 153.

If there is a match determined in Step 1150, the method proceeds to Step 1160 in which the relevant advertising page or banner corresponding to the extracted content data is selected or generated.

In Step 1170, the selected or generated banner ad is combined with the video or website to thereby provide the targeted information on the nearest reseller to the mobile terminal. The reseller information can be handled by application server 130 or it can be forwarded to the appropriate links. The reseller information may include, for example, the nearest shop selling products under the selected banner, a map of the area surrounding the shop, special offers of the reseller, hours of operation, availability of product, and an indication of all products under the banner. In this way, the user viewing streaming video on his or her mobile terminal receives relevant advertising directly related to the location of the mobile terminal.

Figure 12:
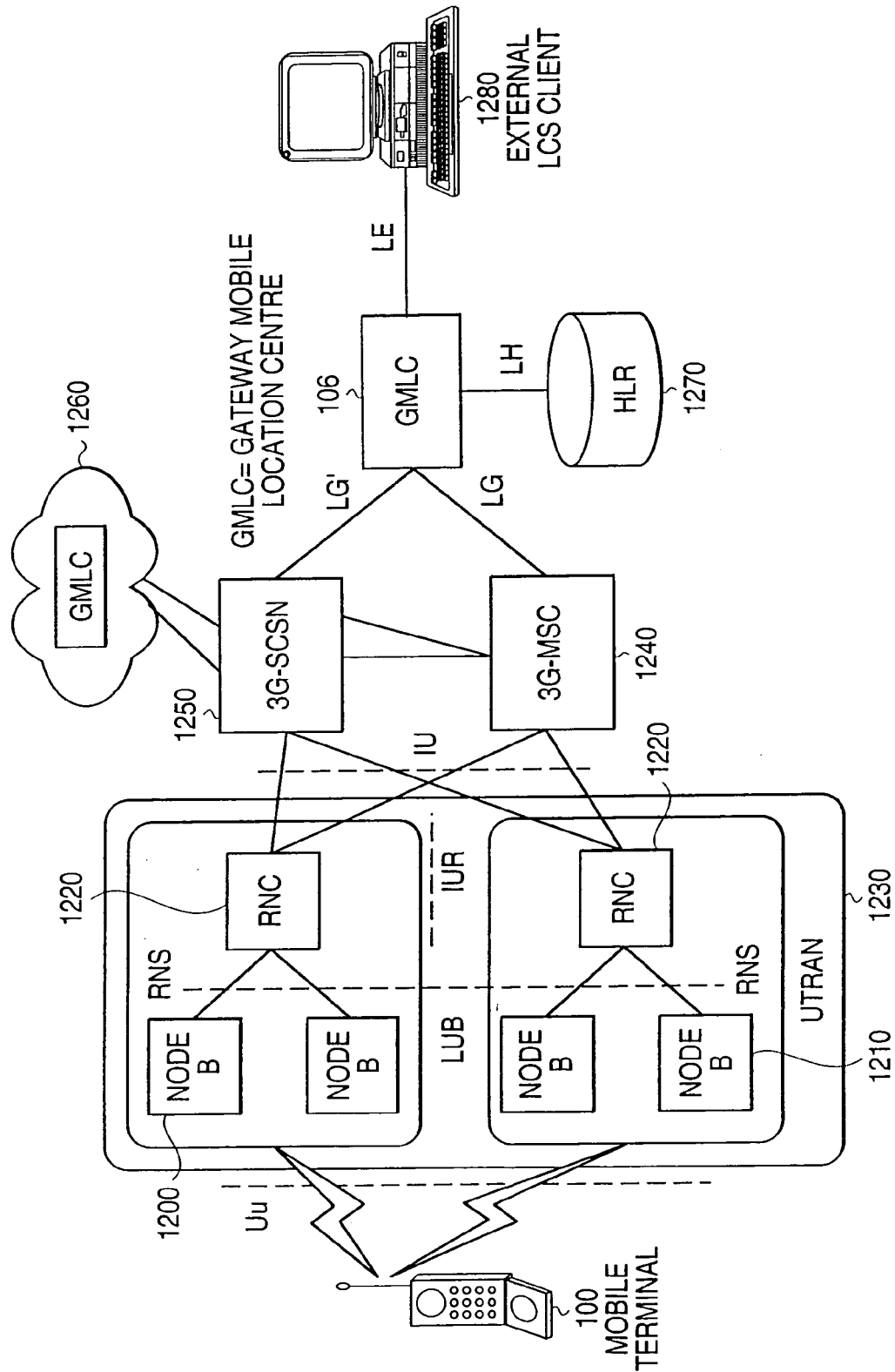
FIG. 12 presents different functionalities of the system.

While any locationing method may be used with this invention, a preferred embodiment uses a $3^{rd}$ generation Mobile IP Telephony network as shown in FIG. 12. The blocks in FIG. 12 represent different functionalities and do not necessarily correspond to different discrete network elements.

The location services are supported by elements throughout the network. Some services are embedded in conventional network elements, such as the Radio Network Controller (RNC), Mobile Services Switching Center (MSC) and Service GPRS Support Node (SGSN). In addition, some new network elements and interfaces are provided to support location services.

One new functionality element in the network is the Location Measurement Unit (LMU), which may or may not be integrated with one of Base Station Subsystems (BSS) in Node B 1200 to Node B 1210. The LMU primarily measures the Real Time Differences (RTD), Absolute Time Difference (ATD), or any other kind of radio interface timing of the signals transmitted by the base stations. These assistance measurements obtained by the LMU are generic status information and can be used by more than one positioning method. The measurements may consist of location measurements specific to one mobile used to compute the location of that mobile or assistance measurements specific to all mobiles in a certain geographic area.

All location, timing difference and assistance measurements obtained by an LMU are supplied to a particular Serving RNC 1220 (SRNC) associated with the base station having the LMU functionality. Instructions concerning the timing, the nature and any periodicity of those measurements are either provided by the SRNC 1220 or are pre-administered in the base station.

In GSM location services, the LMU is a separate element from the GSM network. The communication between the GSM network and LMU is done through GSM air-interface. In the Universal Mobile Telecommunication System (UMTS) location services, the LMU functionality is integrated into the base station, preferably without technical restrictions, at least when an Idle Slot Forward Link—Time Difference of Arrival (ISFL-TDOA) method is used.

The Mobile Terminal (MT) 153 may be involved in various levels in the positioning procedures depending on the positioning method employed. In addition, the role of MT 153 is closely related to the positioning approach used in the system. For example, the functionality of MT 153 may or may not encompass location calculation. Preferably, it can initiate a location service by making a request to the network for positioning (network assisted positioning). If it supports the use of Idle Slot Downlink (IS-DL) sets, then it also performs the following functions:

1) measures and stores the signal during idle periods;
2) correlates with different BCH codes between the idle periods;
3) determines the arrival time of the first detectable path, both for the serving Base Station Subsystem (BSS) and other BSSs that it detects;
4) determines when the idle period occurs; and
5) reports the results back to the network.

Each Node-B is able to shut down transmission during the idle period. This function can be predefined in Node B or can be controlled by RNC. Each Node-B also can handle the functionality of the LMU including the functionality of the Positioning Signal Measurement Function (PSMF) and Location System Operation Function (LSOF). Thus, it is responsible for gathering uplink/downlink radio signal measurements for calculation of a mobile's position. It is also involved in overall operating of location services in the network.

The SRNC 402 in the Universal Terrestrial Radio Access Network (UTRAN) contains functionality required to support location services and procedures between the LMU and location service entities in one Public Land Mobile Network (PLMN). It preferably controls the TDOA IS-DL procedures periodically or according to predetermined parameters, handles each Node-B's power ceasing period and performs the Location System Operation Function (LSOF), Positioning Radio Coordination Function (PRCF), Power Calculation Function (PCF), and Positioning Radio Resource Management (PRRM) entities. This includes provisioning of data, positioning capabilities, location services operation, location calculation, gathering uplink or downlink radio signal measurements for mobile position calculation, managing the positioning of a mobile through overall coordination, reservation and scheduling of resources (including Forward Access Channel/Random Access Channel (FACH/RACH) or Dedicated Channel (DCH)) required to perform positioning measurements of a mobile terminal 153, and controlling the location services radio accesses. SRNC 1220 also calculates the final location estimate and accuracy.

The SRNC 1220 controls a number of LMUs for the purpose of obtaining radio interface measurements to locate or help locate MT 153 in the area that it serves. The SRNC 1220 is administered with capabilities and types of measurements produced by each of its LMUs. The location measurements returned by an LMU to an SRNC 1220 have a generic status and can be used for more than one positioning method (including Time of Arrival (TOA)).

Signaling between an SRNC 1220 and LMU is transferred via the Iub interface, and in some specific periods, via Iur interfaces. The Iur interface supports inter-RNC soft handovers, including location services. Whenever an inter-RNC soft handover occurs Iur supports the functionality of the positioning entities in RNCS, including PCF, PRRM, Positioning Signal Measurement Function (PSMF) and LSOF. In case of SRNC relocation, Iur supports the relocation mechanisms to transfer the PCF, PRRM, PSMF and LSOF functionality from SRNC to Drift RNC (DRNC) in order for DRNCs to be able to handle the responsibility of SRNC in location service processes.

UTRAN 1230 is involved in the handling of various positioning procedures and RAN level overall controlling of location services. It controls an Idle Slot Downlink (IS-DL) method and manages overall coordination and scheduling of resources required to perform positioning of the mobile. In a networkbased positioning approach, UTRAN 1230 calculates the final "location estimate and accuracy and controls a number of LMU/Node B 1200 to 1210 for the purpose of obtaining radio interface measurements to locate or help locate mobile terminal 153 in the serving area.

Generally, UTRAN 1230 provides Cell-id and, timing related data to 3G-MSC 1240. The 3G-MSC 1240 is similar to the MSC in a GSM, network, but the Serving Mobile Location Center (SMLC) functionality may be integrated into SRNC 1120. The functions of 3G-MSC 1240 are billing, coordination, location requests, authorizations of mobile terminals and managing call-related and non-call related positioning requests and operations of the location services.

Since SGSN 1250 has independent mobility management, UT 1230 instead provides Cell-id to SGSN 1250. The location services parameters are included in the lu interface between RNCs 1220 and 3G-MSC 1240 and SGSN 1250. The SGSN is similar to the MSC. The functions of the SGSN are charging, coordination, authorizations of mobile terminals and managing positioning requests and operations of the location services as far as the packet switch accesses are concerned. If the mobile stations support both network-based and mobile-based positioning, the RNC 1220 calculates the position of the mobile when a mobile-based positioning is applied by gathering uplink/downlink (UL/DL) radio signal measurements. The RNC 1220 sends the location information to the UE or to the SGSN. If the SGSN receives the location information, it sends the location information to the CSCF, to the PSAP, or to the GMLC.

The Iu interface transforms coordinate estimates of MT 153 over Radio Access Network Application Part (RANAP) protocol from RNC 1230 to 3G-MSC 1240 and SGSN 1250 and MT 153 positioning related NAS messages, including paging, authentication, etc. messages over RANAP protocol. The interface also maps the location service Quality of Service (QoS) attributes and handles states information between UTRAN 1230 and 3G-MSC 1240.

In a situation where the Mobile Terminal is connected to an external server via IP, the server might want to locate the Mobile Terminal. If the Mobile Terminal is using dynamic IP addressing, the address has to be translated to an understandable address or location request has to be processed otherwise.

The external server could request the GGSN to provide the identity behind the given dynamic IP address. The GGSN can map the dynamic TP address to a MSISDN number, which is used by the external server to locate the Mobile Terminal via normal positioning methods. Alternatively, an IP port number can be reserved for allocation request use in the Mobile Terminal. The external application can then use the dynamic IP address and known (standardized) port number to deliver a positioning request to the Mobile Terminal. The Mobile Terminal then requests its own position via normal positioning procedures, and delivers the result to the external terminal.

Another entirely new functional block is the Gateway Mobile Location Center (GMLC) 1260, which acts as a gateway between Location Service (LCS) clients and the network. GMLC 1260 receives and handles service requests for location information for an indicated mobile phone from external clients, activates the location systems, if needed, and returns the result to the client. GMLC 1260 may request routing information from HLR 1270 or SGSN 1240. After performing registration authorization, it sends a positioning request to and receives final location estimates from 3G-MSC 1250 and SGSN 1240.

Home Location Register 1270 contains location services subscription data and routing information concerning subscriber calls. HLR 1270 is accessible from GMLC 1260 via a Mobile Application Part (MAP) interface.

The external location services client 1280 may be any sort of service application offered by a service provider or content provider. Client 1280 is closely related to the variety of available services. Sometime the Mobile Terminal 153 or a service application in the Mobile Terminal 153 is the client.

In addition to changes in the main interfaces (i.e., Uu, Iub, Iur and Iu) of the network, there are also some interfaces defined to support location services. The Le interface between GMLC 1260 and external location services client 1280 provides the reference point for transforming information transferred between GMLC 1260 and external location services client 1280. This information includes the positioning request and the final result of the positioning process.

The Lh interface passes routing information from HLR 1270 to GMLC 1260 and supports any mobility management related database in HLR 1270. It can also be used by GMLC 1260 to request the address of a visited MSC or SGSN for a particular mobile terminal whose location has been requested. It is preferably a type of MAP interface and may be implemented over a SS7 signaling network or possibly over IP protocol (MAP over IP). The Lg interface allows 3G-MSC 1250 to access GMLC 1260 (Home PLMN or Visited PLMN). The interface transforms subscriber information needed, for example, for authorization and positioning access routing. It can be used by GMLC 1260 to convey a location request to the MSC or SGSN currently serving a particular Mobile Terminal whose location was requested or by an MSC or SGSN to return location results to GMLC 1260. It is preferably a type of MAP interface and may be implemented over a SS7 signaling network or possibly over IP protocol (MAP over IP).

The Lg' interface allows SGSN 1240 to access GMLC 1260 (Home PLMN or Visited PLMN). It may be identical to the Lg interface, but is labeled differently in FIG. 4 to show that it may also be different. The interface transforms subscriber information needed, for example, for authorization and positioning access routing. It is preferably a type of MAP interface and may be implemented over a SS7 signaling network or possibly over IP protocol (MAP over IP).

Preferably, the MAP interfaces are as similar as possible to the MAP interfaces defined for location services in the GSM network. Because there is no Serving MLC (SMLC) in UMTS, the MAP interface between SMLC and VMSC is not needed. The locations services for GSM do not yet include GPRS, so the GPRS part of the UMTS, network is added to the MAP signaling. It is feasible to use the same MAP interface between GMLC and SGSN, than between GMLC and 3G-MSC.

While there has been illustrated and described what are considered to be examples of embodiments of the present invention, it will be understood by those skilled in the art that various changes and modifications may be made, and equivalents may be substituted for elements thereof without departing from the true scope of the present invention. Furthermore, many modifications may be made to adapt a particular situation to the teachings of the present invention without departing from the central scope of the present invention. Therefore, it is intended that the present invention not be limited to the particular embodiments disclosed rather that the present invention includes all embodiments falling within the scope of the appended claims.

The invention claimed is:

1. A method comprising:
 displaying a video on a mobile terminal, wherein the video is received via a digital broadcasting network and includes a product image link;
 receiving input selecting the link;
 sending a location of the mobile terminal in response to receiving input selecting the link, the location determined using a mobile communication network, wherein the mobile communication network is a different network than the digital broadcasting network;
 receiving content via the mobile communication network, the content related to the link and also related to the location of the mobile terminal; and
 displaying the related content.

2. The method of claim 1, further comprising
 communicating the location of the mobile terminal to an application server; and
 searching a database in the application server for reseller information that is associated with the link and the location of the mobile terminal, wherein the related content comprises the reseller information.

3. The method of claim 1, further comprising determining the location of the mobile terminal, wherein the determining the location of the mobile terminal includes:
 determining a network address of the mobile terminal;
 mapping the network address to a mobile identifier integrated services digital network number; and
 determining the location of the mobile terminal based on at least the mobile identifier integrated services digital network number.

4. The method of claim 1, wherein the content received comprises information on a reseller that is located closest to the location of the mobile terminal.

5. The method of claim 1, further comprising determining the location of the mobile terminal, wherein determining the location of the mobile terminal includes:
 communicating radio signals via a base station subsystem;
 measuring the radio signals; and
 calculating the location of the mobile terminal based at least on the measurements of the radio signals.

6. The method of claim 5, wherein the radio signals include at least two radio signals and measuring the radio signals includes:
 measuring a real time difference between at least two of the radio signals; and
 measuring an absolute time difference between at least two of the radio signals.

7. The method of claim 1, further comprising determining the location of the mobile terminal, wherein the determining the location of the mobile terminal includes:
 generating a network-assisted positioning request;
 communicating radio signals between the mobile terminal and a base station subsystem;
 measuring the radio signals generated by the mobile terminal during one or more idle periods;
 storing the measurements of the radio signals;
 determining an arrival time of a first detectable path; and
 determining when the idle periods occur.

8. An apparatus, comprising:
 a transceiver configured to communicate over a mobile communication network;
 a receiver configured to receive digital broadcasting over a digital broadcasting network, wherein the mobile communication network is a different network than the digital broadcasting network;
 a display;
 a processor; and
 a memory including logical instructions stored therein; that when executed, cause the apparatus to:
  display a video on a mobile terminal, wherein the video is received via a digital broadcasting network and includes a product image;
  receive input selecting the link;
  send a location of the apparatus in response to receiving input selecting the link, the location determined using the mobile communication network; and
  receive via the mobile communication network content that is related to the link and also related to the location of the apparatus; and
  displaying the related content.

9. The apparatus of claim 8, wherein the apparatus is configured to
 communicate the selected link and the location of the apparatus to an application server using the mobile communication network.

10. The apparatus of claim 8, wherein the apparatus is configured to:
 communicate radio signals via a base station subsystem;
 measure the radio signals; and
 calculate the location of the apparatus based at least on the measurements of the radio signals.

11. The apparatus of claim 10, wherein the transceiver is configured to receive the radio signals, and wherein the apparatus is configured to determine a first arrival time for a first detectable path for a first base subsystem and a second arrival time for a second detectable path for a second base subsystem.

12. The apparatus of claim 10, wherein the apparatus is configured to:
 measure the radio signals generated during idle periods;
 determine an arrival time of a first detectable path; and
 determine when the idle periods occur.

13. The apparatus of claim 10, wherein the apparatus is configured to:
 receive interactive betting content over the mobile communication network that enables a bet to be made from the apparatus; and in response to a bet being made, receive via a mobile communication network link related to the bet.

14. An apparatus comprising:
a processor; and
a memory having stored therein a database and logical instructions, that when the logical instructions are executed, cause the apparatus to:
provide a link to a mobile terminal, wherein the link is positioned in a video displayed on the mobile terminal and wherein the link corresponds to an image of a product in the video, wherein the video is transmitted to the mobile terminal by a digital broadcasting network;
receive an automatically determined location of the mobile terminal over a mobile communication network as a result of the selection of the link, wherein the mobile communication network is a different network than the digital broadcasting network;
search a database to determine content that is related to the link and the location of the mobile terminal; and
provide the related content to the mobile terminal over the mobile communication network.

15. An apparatus comprising:
a receiver configured to receive digital broadcasting over a digital broadcasting network;
means for providing a link on a mobile terminal, wherein the link is positioned in a video displayed on the mobile terminal and the link corresponds to an image of a product in the video, wherein the video is transmitted to the mobile terminal via the digital broadcasting network;
means for receiving a selection of the link;
means for automatically determining the location of the mobile terminal using a mobile communication network as a result of the selection of the link and, wherein the mobile communication network is a different network than the digital broadcasting network;
means for determining content that is related to the linked resource and also related the location of the mobile terminal; and
means for providing the related content to the mobile terminal over the mobile communication network.

16. The method of claim 1, wherein the apparatus is configured to stop the delivery of the video while the related content is displayed in response to the selection of the link.

17. The apparatus of claim 8, wherein the apparatus is configured to stop the delivery of the video while content related to the link is displayed in response to communication of the selected link.

18. The apparatus of claim 14, wherein the apparatus is configured to stop the video while providing the related content.

19. The apparatus of claim 15, wherein the means for providing a link to the resource is configured to stop the video while the related content is provided to the mobile terminal.

20. A method comprising:
providing a link to a mobile terminal, wherein the link is positioned in a video displayed on the mobile terminal, and wherein the link corresponds to an image of a product in the video, wherein the video is transmitted to the mobile terminal by a digital broadcasting network;
receiving an automatically determined location of the mobile terminal over a mobile communication network as a result of the selection of the link, and wherein the mobile communication network is a different network than the digital broadcasting network;
searching a database to determine content that is related to the link and the location of the mobile terminal; and
providing the related content to the mobile terminal over the mobile communication network.

21. The method of claim 20, wherein the providing of the related content over the mobile communication network stops displaying of the video.

22. A computer-readable medium having computer-executable components for causing a computer to perform the steps, comprising:
displaying a video on a mobile terminal, wherein the video is received via a digital broadcasting network and includes a product image link;
receiving input selecting the link;
sending a location of the mobile terminal, the location determined using a mobile communication network in response to receiving input selecting the link, wherein the mobile communication network is a different network than the digital broadcasting network;
receiving content via the mobile communication network, the content related to the link and also related to the location of the mobile terminal; and
displaying the content.

23. A computer-readable medium having computer-executable components for causing a computer to perform:
providing a link on a mobile terminal, wherein the link is positioned in a video displayed on the mobile terminal, and wherein the link corresponds to an image of a product in the video, wherein the video is transmitted to the mobile terminal by a digital broadcasting network;
receiving an automatically determined location of the mobile terminal over a mobile communication network as a result of the selection of the link, wherein the mobile communication network is a different network than the digital broadcasting network;
searching a database to determine content that is related to the link and the location of the mobile terminal; and
providing the related content to the mobile terminal over the mobile communication network.

* * * * *